(12) United States Patent
Zhao et al.

(10) Patent No.: US 12,498,273 B2
(45) Date of Patent: Dec. 16, 2025

(54) NTC TEMPERATURE MEASURING CIRCUIT, RESPIRATOR AND POWER-ON SELF-TEST METHOD FOR RESPIRATOR

(71) Applicants: VINCENT MEDICAL (DONG GUAN) MANUFACTURING CO., LTD, Dongguan (CN); VINCENT MEDICAL (DONG GUAN) TECHNOLOGY CO., LTD, Dongguan (CN)

(72) Inventors: Jun Zhao, Dongguan (CN); Jiebing Xu, Dongguan (CN); Haibin Yu, Dongguan (CN)

(73) Assignees: VINCENT MEDICAL (DONG GUAN) MANUFACTURING CO., LTD, Guangdong (CN); VINCENT MEDICAL (DONG GUAN) TECHNOLOGY CO., LTD, Guangdong (CN)

( * ) Notice: Subject to any disclaimer, the term of this patent is extended or adjusted under 35 U.S.C. 154(b) by 694 days.

(21) Appl. No.: 17/905,243

(22) PCT Filed: Dec. 24, 2021

(86) PCT No.: PCT/CN2021/141039
§ 371 (c)(1),
(2) Date: Aug. 29, 2022

(87) PCT Pub. No.: WO2022/174674
PCT Pub. Date: Aug. 25, 2022

(65) Prior Publication Data
US 2023/0145242 A1    May 11, 2023

(30) Foreign Application Priority Data

Feb. 22, 2021 (CN) .......................... 202110196999.1

(51) Int. Cl.
*G01K 7/22* (2006.01)

(52) U.S. Cl.
CPC ..................................... *G01K 7/22* (2013.01)

(58) Field of Classification Search
CPC ... G01K 7/22; G01K 15/007; A61M 16/1075; A61M 2205/3368; A61M 2205/702; A61M 16/0003; A61M 2205/3327
See application file for complete search history.

(56) References Cited

U.S. PATENT DOCUMENTS

| 8,197,123 | B2 * | 6/2012 | Snyder | ................... G01K 15/00 374/173 |
| 2009/0110022 | A1 | 4/2009 | Snyder et al. | |
| 2015/0083708 | A1 | 3/2015 | Xiang et al. | |

FOREIGN PATENT DOCUMENTS

| CN | 103234655 A | 8/2013 |
| CN | 203287342 U | 11/2013 |

(Continued)

*Primary Examiner* — Victoria Murphy
(74) *Attorney, Agent, or Firm* — MUNCY, GEISSLER, OLDS & LOWE, P.C.

(57) ABSTRACT

An NTC temperature measuring circuit, a respirator and a power-on self-test method for the respirator are provided. The NTC temperature measuring circuit includes temperature measuring module, switch module, control module and detection module; the control module is electrically connected to the temperature measuring module, the detection module and the switch module in respective; the switch module is electrically connected to the temperature measuring module and the detection module in respective; the temperature measuring module is configured to monitor a temperature of a detected part in a heating loop; the switch module is configured to switch the on-off between the temperature measuring module and the detection module; the detection module is configured to verify a temperature of the temperature measuring circuit; and the control module is (Continued)

configured to adjust the temperature of the detected part in the heating loop, and to judge the accuracy of the temperature measurement.

7 Claims, 3 Drawing Sheets

(56) References Cited

FOREIGN PATENT DOCUMENTS

| | | | |
|---|---|---|---|
| CN | 106768457 | A | 5/2017 |
| CN | 206773554 | U | 12/2017 |
| CN | 207408023 | U | 5/2018 |
| CN | 108362400 | A | 8/2018 |
| CN | 110488889 | A | 11/2019 |
| CN | 110780142 | A | 2/2020 |
| CN | 112857608 | A | 5/2021 |
| CN | 215262143 | U | 12/2021 |
| CN | 118243760 | A | 6/2024 |
| EP | 2843383 | A1 | 3/2015 |

* cited by examiner

NTC TEMPERATURE MEASURING CIRCUIT, RESPIRATOR AND POWER-ON SELF-TEST METHOD FOR RESPIRATOR

TECHNICAL FIELD

The present disclosure relates to the technical field of medical devices, in particular to an NTC temperature measuring circuit, a respirator and a power-on self-test method for the respirator.

BACKGROUND

In the modern clinical medicine, as an effective means to artificially replace the spontaneous respiration function, a respirator has been widely applied in respiratory failure caused by various reasons, anesthesia respiratory management during a major surgery, respiratory support therapy and first-aid and resuscitation, so it plays an important role in the field of modern medicine. The respirator is a crucial medical device capable of preventing and treating the respiratory failure, reducing complications and saving and prolonging the lives of patients.

The respirator is an NTC (Negative Temperature Coefficient) thermistor temperature measuring product. In order to ensure the accuracy of a temperature measuring circuit of the respirator, the respirator needs to be detected during a certain period (usually 3 months or 6 months). The existing detection method is to manually detect whether a circuit is faulty by adopting a resistor or other circuit detecting instruments. Usually, a standard resistor is adopted to replace NTC for detection and calibration. For example, when NTC is 2.252K and the used standard resistor is 2.2K, the equipment display temperature is 25.5° C., and when the used standard resistor is 1K, the equipment display temperature is 44.5° C. If the detection error is in a scope of +/−0.5° C., it is qualified; and if not, it is unqualified. The existing detection solution has the following defects: 1. As the manual detection, the existing detection solution requires an extra standard detection resistor, so the cost is increased; and 2. The detection during a period scope cannot ensure the accuracy of the temperature measuring circuit.

Therefore, the prior art still needs to be improved and developed.

SUMMARY

In view of the shortcomings of the prior art, the purpose of the present disclosure is to provide an NTC temperature measuring circuit, a respirator and a power-on self-test method for the respirator, so as to solve problems of high detection cost of an NTC temperature measuring circuit of the existing respirator and inability of ensuring the accuracy.

The technical solution of the present disclosure is as follows:

An NTC temperature measuring circuit is used in a heating loop and includes a temperature measuring module, a switch module, a control module and a detection module, the control module is electrically connected to the temperature measuring module, the detection module and the switch module in respective;

the switch module is electrically connected to the temperature measuring module and the detection module in respective;

the temperature measuring module is configured to monitor a temperature of a detected part in the heating loop and obtain a first temperature data;

the switch module is configured to switch the on-off between the temperature measuring module and the detection module according to an enable signal output from the control module;

the detection module is configured to verify the temperature of the temperature measuring circuit and obtain a second temperature data;

the control module is configured to obtain the first temperature data and adjust the temperature of the detected part in the heating loop according to the first temperature data, and to obtain the second temperature data and judge the accuracy of the temperature measurement according to the second temperature data.

Further, the temperature measuring module includes an NTC thermistor, one end of the NTC thermistor is electrically connected to the switch module, and the other end of the NTC thermistor is electrically connected to the control module and grounded.

Further, the detection module includes a plurality of detection resistors, one end of each detection resistor is electrically connected to the switch module, and the other end of each detection resistor is electrically connected to the control module.

Further, each detection resistor is a standard resistor.

Further, the switch module includes a multi-way switch, which is respectively connected to the control module and a power supply, and the multi-way switch is also connected to the NTC thermistor and the detection resistors.

Further, the control module includes a multipoint control unit, an input end of the multipoint control unit is electrically connected to the temperature measuring module and the detection module, and an output end of the multipoint control unit is electrically connected to the switch module.

Further, the NTC temperature measuring circuit further includes an operational amplifier, an input end of the operational amplifier is electrically connected to the NTC thermistor and the detection resistors, and an output end of the operational amplifier is electrically connected to the multipoint control unit.

Based on the same innovation and creation, the present disclosure further provides a respirator, and the respirator includes:

a heating loop;

an NTC temperature measuring circuit described above, wherein the temperature measuring module and the detection module are arranged in the heating loop.

Further, the respirator further includes:

a display, which is electrically connected to the control module.

Based on the same innovation and creation, the present disclosure further provides a power-on self-test method for the respirator, and the method is applied in the above respirator and includes the steps of:

obtaining a temperature data of a temperature measuring circuit of the respirator through a detection module;

comparing the temperature data with a preset temperature value through a control module, wherein if the temperature data is within an error scope, the respirator is controlled to be powered on normally; and monitoring the temperature of gas of a detected part in a heating loop through the temperature measuring module, and adjusting the temperature of the gas in the heating loop through the control module.

The present disclosure provides the NTC temperature measuring circuit, the respirator and the power-on self-test method for the respirator, wherein the NTC temperature measuring circuit is used in the heating loop. The NTC temperature measuring circuit includes the temperature measuring module, the switch module, the control module and the detection module; the control module is electrically connected to the temperature measuring module, the detection module and the switch module in respective; the switch module is electrically connected to the temperature measuring module and the detection module in respective; the temperature measuring module is configured to monitor the temperature of the detected part in the heating loop and obtain the first temperature data; the switch module is configured to switch the on-off between the temperature measuring module and the detection module according to the enable signal output from the control module; the detection module is configured to verify the temperature of the temperature measuring circuit and obtain the second temperature data; and the control module is configured to obtain the first temperature data and adjust the temperature of the detected part in the heating loop according to the first temperature data, and to obtain the second temperature data and judge the accuracy of the temperature measurement according to the second temperature data. In the present disclosure, the temperature of the gas in the heating pipeline is monitored through the temperature measuring module, and the temperature measuring accuracy is verified through the detection module during power-on, so as to realize power-on self-test, find problems in time, ensure the temperature measuring accuracy, avoid an accident risk, avoid manual inspection and reduce the detection cost.

BRIEF DESCRIPTION OF THE DRAWINGS

To better clarify the embodiment of the present disclosure or the technical solution in the prior art, the drawings required to illustrate the embodiments or the prior art will be simply described below. It is apparent that the drawings described below merely illustrate some embodiments of the present disclosure. Those ordinarily skilled in the art can obtain other drawings according to the structures of these drawings without creative labor on the basis of those drawings.

Figure 1:
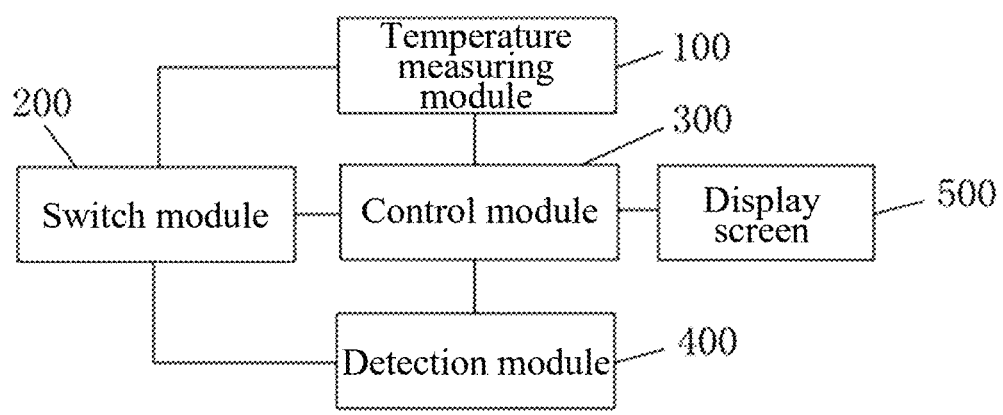
FIG. 1 is a functional module architecture diagram of an NTC temperature measuring circuit in the present disclosure.

Reference signs: 100—temperature measuring module, 200—switch module, 300—control module, 400—detection module, 500—display screen.

DETAILED DESCRIPTION OF THE EMBODIMENTS

The present disclosure provides an NTC temperature measuring circuit, a respirator and a power-on self-test method for the respirator, wherein the NTC temperature measuring circuit is applied products with NTC temperature measuring, such as the respirator and a heater humidifier. The respirator may perform self-test during each power-on by adding a plurality of standard resistors on the NTC temperature measuring circuit, normal power-on is allowed after it is qualified, and if not, a fault signal will be sent to inform users for maintenance. In order to make the objectives, technical solution and effects of the present disclosure clearer and definer, the examples of the present disclosure will be described in detail below in conjunction with the drawings. It is understood that the specific embodiments described herein are merely used for explaining the present disclosure, instead of limiting the present disclosure.

In the scope of the implementation mode and the applied patent, "a/an", "one", and "the" and "this" may include the plural forms, unless otherwise specified in the context. If the descriptions "first" and "second" are involved in the embodiments of the present disclosure, the descriptions "first" and "second" are merely used for description, instead of being understood as indicating or implying relative importance or impliedly indicating the quantity of the showed technical features. Thus, the features defined with "first" and "second" may expressly or impliedly one or more features.

It is further understood that term "include" used in the specification of the present disclosure means the feature, integer, step, operation, unit and/or component, but not excluding existing or added one or a plurality of features, integers, steps, operations, units and/or components and/or their combination. It is understood that when the unit is "connected" or "coupled" to another unit, it may be directly connected or coupled to other units, or there may be an intermediate unit. In addition, "connecting" or "coupling" used here may include wireless connection or wireless coupling. Terms "and/or" used here include all of one or more associated list items or any unit or all combinations.

Those skilled in the art may understood, unless otherwise defined, all terms (including technical terms and scientific terms) used here have the same meaning as the general understanding of those of ordinary skill in the art. It is also understood that, for example, those terms defined in a general dictionary shall be understood as the same meaning consistent with that in the text of the prior art, and unless being specifically defined herein, otherwise, it cannot be explained in an ideal or formal meaning.

Thus, the technical solutions of various embodiments may be mutually combined, but must be achieved by those of ordinary skill in the art. When the combination of the technical solution has mutual contradiction or cannot be achieved, it should believe that such combination of the technical solution does not exist and does not fall in the protection range required by the present disclosure.

Through research, the inventor has found the existing detection for the respirator is mainly performed by an appointed worker regularly (3 months or 6 months), and the circuit is manually detected whether there is a fault through the resistor or other circuit detection instrument. Thus, it will not only invest great manpower and material resources and increase the production cost, but also the periodic detection has a risk of inaccurate temperature measuring, resulting a low reliability.

For the above technical problem, the present disclosure provides the NTC temperature measuring circuit and the respirator. The temperature of the gas in the heating pipeline is monitored through the temperature measuring module, and the temperature measuring accuracy is verified through the detection module during power-on, so as to realize power-on self-test, find problems in time, ensure the temperature measuring accuracy, avoid an accident risk, avoid manual inspection and reduce the detection cost.

Figure 2:
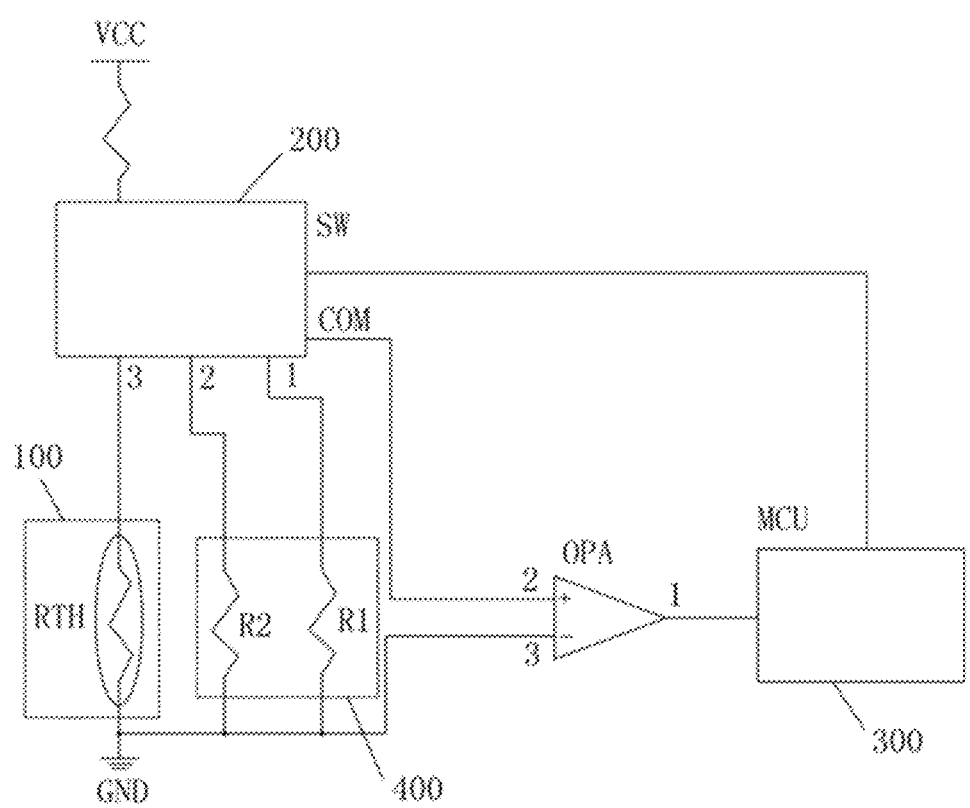
FIG. 2 is a schematic diagram of an NTC temperature measuring circuit in the present disclosure.

Please refer to FIG. 1-FIG. 2 at the same time, the present disclosure provides a preferred embodiment of the NTC temperature measuring circuit.

As shown in FIG. 1, the NTC temperature measuring circuit provided by the present disclosure can be used in a heating loop and includes a temperature measuring module 100, a switch module 200, a control module 300 and a detection module 400. The control module 300 is electrically connected to the temperature measuring module 100, the detection module 400 and the switch module 200 in respective; and the switch module 200 is electrically connected to the temperature measuring module 100 and the detection module 400 in respective. Wherein the temperature measuring module 100 is configured to monitor a temperature of a detected part in the heating loop and obtain a first temperature data; the switch module 200 is configured to switch the on-off between the temperature measuring module 100 and the detection module 400 according to an enable signal output from the control module 300; the detection module 400 is configured to verify the temperature of a temperature measuring circuit and obtain a second temperature data; and the control module 300 is configured to obtain the first temperature data and adjust the temperature of the detected part in the heating loop according to the first temperature data, and to obtain a second temperature data and judge the accuracy of the temperature measurement according to the second temperature data.

Specifically, the temperature measuring module 100 is arranged in the heating loop, which may monitor the temperature of the detected part in the heating loop so as to obtain the first temperature data, and the monitored temperature may be fed back to the control module 300; and the control module 300 may adjust and control the temperature of the gas in the heating loop according to the first temperature data. In order to ensure the temperature measuring accuracy, this application adds the detection module 400 in the NTC temperature measuring circuit for perform self-test during power-on, so that the temperature of the temperature measuring circuit can be detected and the second temperature data can be obtained, and the control module 300 can judge the temperature measuring accuracy according to the second temperature data. Thus, the NTC temperature measuring circuit provided in this application can monitor the temperature of the detected part in the heating pipeline through the temperature measuring module 100 and verify the temperature measuring accuracy through the detection module 400 during the power-on, so as to realize power-on self-test, find problems in time, ensure the temperature measuring accuracy, avoid an accident risk, have a high reliability, avoid manual inspection and reduce the detection cost.

Please refer to FIG. 2, in a further implementation mode of one embodiment, the temperature measuring module 100 includes an NTC thermistor, one end of the NTC thermistor RTH is electrically connected to the switch module 200, and the other end of the NTC thermistor RTH is electrically connected to the control module 300 and grounded.

Specifically, the NTC thermistor RTH is located in a temperature data line and partially connected to the detected part through an installation hole and other methods. For example, the gas temperature of the heating respiration loop (applied in the respirator) is detected, the NTC thermistor RTH is connected to the power supply through the switch module 200, so that the power supply can supply power to the NTC thermistor RTH, and the NTC thermistor RTH is also electrically connected to the control module 300. When the NTC thermistor RTH and the switch module 200 are in a conducting state, the temperature in the heating loop can be fed back to the control module 300, thereby realizing monitoring the temperature of the gas in the heating loop. Wherein the heating loop refers to a standby pipeline for the respiration equipment in the respirator, a heating wire is arranged in the respirator, with functions of humidifying and heating gas.

Please still refer to FIG. 2, in a further implementation of one embodiment, the detection module 400 includes a plurality of detection resistors, one end of each detection resistor is electrically connected to the switch module 200, and the other end of each detection resistor is electrically connected to the control module 300.

Please still refer to FIG. 2, further, the switch module 200 includes a multi-way switch SW, which is respectively connected to the control module 300 and a power supply (may be a constant flow source or a constant voltage source), and the multi-way switch SW is also connected to the NTC thermistor RTH and the detection resistors.

Specifically, the detection resistors are connected to the NTC thermistor RTH through the multi-way switch SW and the control module 300. The control module 300 may control the multi-way switch to realize switching between the NTC thermistor RTH and the detection resistors. During power-on, the detection resistors are used for conduction firstly, to realize power-on self-test. After the detection is qualified, it is switched to the NTC thermistor RTH, thereby realizing the temperature detection of the heating loop. Certainly, if it is unqualified during self-test, a fault signal will be sent to inform users for maintenance before normal power-on.

In some embodiments, the detection resistors are the standard resistors, which have fixed values. The detection resistors are used for replace the NTC thermistor during the detection, so as to obtain an expected temperature for detection. For example, when the NTC thermistor RTH is 2.252KΩ and the used standard resistor is 2.2KΩ, the equipment display temperature is 25.5° C.; when the used standard resistor is 1KΩ, the equipment display temperature is 44.5° C.; if the displayed temperature error is within the scope of +/−0.5° C., it is qualified and can be powered on normally, if not, the temperature measuring circuit has a fault and is unqualified, the fault signal may be sent through a sound or light signal, so as to remind users of maintenance.

Please still refer to FIG. 2, in some embodiments, two detection resistors are provided, which are a first detection resistor R1 and a second detection resistor R2 and respectively connected to a first pin and a second pin of the multi-way switch SW, and the NTC thermistor RTH is connected to a third pin of the multi-way switch. During power-on self-test, the detection resistors with different resistance values may be switched in turn through the control module 300, thus, if the display temperatures of all detection resistors are qualified, it can be powered on normally. It may be understood that the more the detection resistors, the more accurate the detection result is. In an actual application, the quantity of the detection resistors may be set according to the actual situation.

Please still refer to FIG. 2, in a further implementation of one embodiment, the control module 300 includes a multipoint control unit MCU, an input end of the multipoint control unit MCU is electrically connected to the temperature measuring module 100 and the detection module 400, and an output end of the multipoint control unit MCU is electrically connected to the switch module 200.

Specifically, this application realizes switching the multi-way switch SW through the multipoint control unit MCU, so as to realize the self-test of the equipment. Further, the NTC temperature measuring circuit further includes an operational amplifier OPA, an input end of the operational amplifier OPA is electrically connected to the NTC thermistor RTH and the detection resistor, an output end of the operational amplifier OPA is electrically connected to the multipoint control unit MCU, wherein the first pin of the operational amplifier OPA is connected to the multipoint control unit MCU, the second pin of the operational amplifier OPA is connected to a common end COM of the multi-way switch SW, the third pin of the operational amplifier OPA is connected to the NTC thermistor RTH, the first detection resistor R1 and the second detection resistor R2, and the operational amplifier OPA collects the voltage of NTC thermistor RTH, the first detection resistor R1 and the second detection resistor R2 to measure the temperature. In some embodiments, the model of the multipoint control unit is MSP 430.

In some embodiments, the present disclosure further provides a respirator, which includes a heating loop and an NTC temperature measuring circuit described above, wherein the temperature measuring module and the detection module are arranged in the heating loop. It is specifically described above, and not repeated herein.

Figure 3:
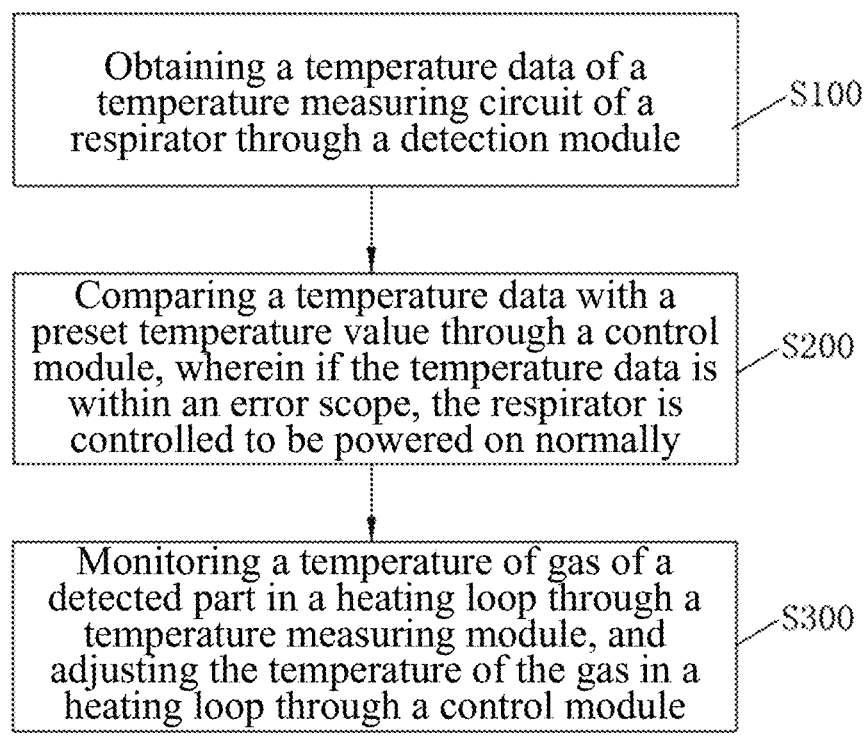
FIG. 3 is flow diagram of a power-on self-test method for a respirator in the present disclosure.

Please refer to FIG. 3, in some embodiments, the respirator further includes a display, which is electrically connected to the control module, and when detecting a fault of the temperature measuring circuit, the fault may be displayed on a display screen, so as to send out a fault signal. It may be understood that, in some embodiments, the fault signal may be sent through an alarm light or a loudspeaker, etc.

Please refer to FIG. 3, in some embodiments, the present disclosure further provides a power-on self-test method for the respirator, and the method is applied in the above respirator and includes the steps of:

S100: obtaining a temperature data of a temperature measuring circuit of the respirator through a detection module;

S200: comparing the temperature data with a preset temperature value through a control module, wherein if the temperature data is within an error scope, the respirator is controlled to be powered on normally; and S300: monitoring the temperature of gas of a detected part in a heating loop through the temperature measuring module, and adjusting the temperature of the gas in the heating loop through the control module.

Specifically, when the respirator is powered on, the temperature measuring accuracy is verified through the detection module first. If the measured temperature is within the error scope, the respirator is powered on normally; otherwise, it will remind users of maintenance, thereby achieving the purse of power-on self-test. After power-on, the temperature of the gas of the detected part in the heating loop may be monitored in real time through the temperature measuring module, the measured temperature data is fed back to the control module, and the control module may regulate the temperature of the gas in the heating loop according to the measured temperature data.

In conclusion, the present disclosure provides the NTC temperature measuring circuit, the respirator and the power-on self-test method for the respirator, wherein the NTC temperature measuring circuit is used in the heating loop and includes the temperature measuring module, the switch module, the control module and the detection module; the control module is electrically connected to the temperature measuring module, the detection module and the switch module in respective; the switch module is electrically connected to the temperature measuring module and the detection module in respective; the temperature measuring module is configured to monitor the temperature of the detected part in the heating loop and obtain the first temperature data; the switch module is configured to switch the on-off between the temperature measuring module and the detection module according to the enable signal output from the control module; the detection module is configured to verify the temperature of the temperature measuring circuit and obtain the second temperature data; and the control module is configured to obtain the first temperature data and adjust the temperature of the detected part in the heating loop according to the first temperature data, and to obtain the second temperature data and judge the accuracy of the temperature measurement according to the second temperature data. In the present disclosure, the temperature of the detected part in the heating pipeline is monitored through the temperature measuring module, and the temperature measuring accuracy is verified through the detection module during power-on, so as to realize power-on self-test, find problems in time, ensure the temperature measuring accuracy, avoid an accident risk, avoid manual inspection and reduce the detection cost.

It is understood that the application of the present disclosure is not limited to the above examples, those of ordinary skill in the art can make improvements or changes according to the above specification. However, these improvements or changes fall in the protection scope of the claims of the present disclosure.

What is claimed is:

1. A negative temperature coefficient (NTC) temperature measuring circuit configured for use in a heating loop, comprising:
    a temperature measuring module;
    a switch module;
    a control module; and
    a detection module,
    wherein the control module is electrically connected to the temperature measuring module, the detection module and the switch module respectively;
    the switch module is electrically connected to the temperature measuring module and the detection module respectively;
    the temperature measuring module is configured to monitor a temperature of a detected part in the heating loop and obtain a first temperature data;
    the switch module is configured to switch on-off between the temperature measuring module and the detection module according to an enable signal output from the control module;
    the detection module is configured to verify a temperature of the temperature measuring circuit and obtain a second temperature data;
    the control module is configured to obtain the first temperature data and adjust the temperature of the detected part in the heating loop according to the first temperature data, and to obtain the second temperature data;
    wherein the temperature measuring module comprises an NTC thermistor, one end of the NTC thermistor is electrically connected to the switch module, and the other end of the NTC thermistor is electrically connected to the control module and grounded,
    wherein the detection module comprises a plurality of detection resistors, one end of each of the plurality of detection resistors is electrically connected to the switch module, and the other end of each of the plurality of detection resistors is electrically connected to the control module and grounded;
    wherein each of the plurality of detection resistors is a standard resistor;
    wherein the plurality of standard resistors have fixed resistance values, the switch module is configured to selectively connect the plurality of standard resistors during power-on to replace the NTC thermistor so as to obtain an expected temperature for detection, and the control module is configured to compare the second temperature data with a preset temperature value and judge whether the temperature measuring circuit is qualified before normal power-on.

2. The NTC temperature measuring circuit according to claim 1, wherein the switch module comprises a multi-way switch, which is respectively connected to the control module and a power supply, and the multi-way switch is also connected to the NTC thermistor and the plurality of detection resistors.

3. The NTC temperature measuring circuit according to claim 2, wherein the control module comprises a multipoint control unit, an input end of the multipoint control unit is electrically connected to the temperature measuring module and the detection module, and an output end of the multipoint control unit is electrically connected to the switch module.

4. The NTC temperature measuring circuit according to claim 3, wherein the NTC temperature measuring circuit further comprises an operational amplifier, an input end of the operational amplifier is electrically connected to the NTC thermistor and the plurality of detection resistors, and an output end of the operational amplifier is electrically connected to the multipoint control unit.

5. A respirator, comprising:
the heating loop;
the NTC temperature measuring circuit according to claim 1, wherein the temperature measuring module and the detection module are arranged in the heating loop.

6. The respirator according to claim 5, wherein the respirator further
a display, which is electrically connected to the control module.

7. A power-on self-test method for the respirator according to claim 5, wherein the method comprises the steps of:
obtaining a temperature data of the temperature measuring circuit of the respirator through the detection module;
comparing the temperature data with a preset temperature value through the control module, wherein if the temperature data is within an error scope, the respirator is controlled to be powered on normally; and
monitoring the temperature of gas of a detected part in the heating loop through the temperature measuring module, and adjusting the temperature of the gas in the heating loop through the control module.

* * * * *